(12) United States Patent
Park et al.

(10) Patent No.: US 8,442,091 B2
(45) Date of Patent: May 14, 2013

(54) MICROCHANNEL LASER HAVING MICROPLASMA GAIN MEDIA

(75) Inventors: Sung-Jin Park, Champaign, IL (US); J. Gary Eden, Champaign, IL (US); Paoyei Chen, McKinney, TX (US); Paul A. Tchertchian, Mission Viejo, CA (US); Thomas M. Spinka, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 75 days.

(21) Appl. No.: 12/682,977

(22) PCT Filed: Oct. 27, 2008

(86) PCT No.: PCT/US2008/081357
§ 371 (c)(1),
(2), (4) Date: Aug. 2, 2010

(87) PCT Pub. No.: WO2009/055807
PCT Pub. Date: Apr. 30, 2009

(65) Prior Publication Data
US 2010/0296978 A1    Nov. 25, 2010

Related U.S. Application Data

(60) Provisional application No. 61/000,400, filed on Oct. 25, 2007.

(51) Int. Cl.
*H01S 3/091*    (2006.01)
(52) U.S. Cl.
USPC ............. 372/76; 372/69; 372/62; 372/61; 372/55; 372/45.01
(58) Field of Classification Search ............ 372/76, 372/69, 62, 61, 55, 45.01
See application file for complete search history.

(56) References Cited

U.S. PATENT DOCUMENTS

| | | |
|---|---|---|
| 4,367,554 A | 1/1983 | Schlossberg |
| 4,672,624 A | 6/1987 | Ford |

(Continued)

FOREIGN PATENT DOCUMENTS

| | | |
|---|---|---|
| WO | WO 2007/087285 | 8/2007 |
| WO | WO 2008/013820 | 1/2008 |

OTHER PUBLICATIONS

Park et al., "Microdischarge Arrays: A New Family of Photonic Devices," *IEEE Journal on Selected Topics in Quantum Electronics*, vol. 8, No. 1, pp. 139-147, Jan./Feb. 2002.

(Continued)

*Primary Examiner* — Kinam Park
(74) *Attorney, Agent, or Firm* — Greer, Burns & Crain Ltd.

(57) ABSTRACT

The invention provides microchannel lasers having a microplasma gain medium. Lasers of the invention can be formed in semiconductor materials, and can also be formed in polymer materials. In a microlaser of the invention, high density plasmas are produced in microchannels. The microplasma acts as a gain medium with the electrodes sustaining the plasma in the microchannel. Reflectors are used with the microchannel for obtaining optical feedback to obtain lasing in the microplasma gain medium in devices of the invention for a wide range of atomic and molecular species. Several atomic and molecular gain media will produce sufficiently high gain coefficients that reflectors (mirrors) are not necessary. Microlasers of the invention are based on microplasma generation in channels of various geometries. Preferred embodiment microlaser designs can be fabricated in semiconductor materials, such as Si wafers, by standard photolithographic techniques, or in polymers by replica molding.

22 Claims, 6 Drawing Sheets

U.S. PATENT DOCUMENTS

| | | | |
|---|---|---|---|
| 6,192,596 B1 * | 2/2001 | Bennett et al. | 34/76 |
| 6,194,833 B1 | 2/2001 | DeTemple et al. | |
| 6,563,257 B2 | 5/2003 | Vojak et al. | |
| 7,112,918 B2 * | 9/2006 | Eden et al. | 313/356 |
| 7,642,720 B2 | 1/2010 | Eden et al. | |
| 2002/0113553 A1 | 8/2002 | Vojak et al. | |
| 2003/0132693 A1 * | 7/2003 | Eden et al. | 313/356 |
| 2004/0206959 A1 | 10/2004 | Heeger et al. | |
| 2005/0148270 A1 | 7/2005 | Eden et al. | |
| 2005/0265647 A1 | 12/2005 | Vakhshoori et al. | |
| 2006/0038490 A1 | 2/2006 | Eden et al. | |
| 2006/0082319 A1 | 4/2006 | Eden et al. | |
| 2007/0108910 A1 | 5/2007 | Eden et al. | |
| 2007/0170866 A1 * | 7/2007 | Eden et al. | 313/631 |
| 2007/0200499 A1 | 8/2007 | Eden et al. | |
| 2010/0296978 A1 | 11/2010 | Park et al. | |
| 2011/0037102 A1 | 2/2011 | Tchertchian et al. | |
| 2011/0109224 A1 | 5/2011 | Eden et al. | |

OTHER PUBLICATIONS

Park et al., "40 000 pixels arrays of ac-excited silicon microcavity plasma devices," *Applied Physics Letters*, 86, 111501 1-3, 2005.

Kim et al., "Arrays of Microplasma Devices Fabricated in Photodefinable Glass and Excited AC or DC by Interdigitated Electrodes," *IEEE Photonics Technology Letters*, vol. 17, No. 7, pp. 1543-1545, Jul. 2005.

Vojak et al., "Multistage, monolithic ceramic microdischarge device having an active length of ~.027 mm," *Applied Physics Letters*, vol. 78, No. 10, pp. 1340-1342, Mar. 5, 2001.

Park et al., "Performance of Microdischarge Devices and Arrays with Screen Electrodes," *IEEE Photonics Technology Letters*, vol. 13, No. 1, pp. 61-63, Jan. 2001.

Wagner et al. "Excitation of a microdischarge with a reverse-biased *pn* junction," *Applied Physics Letters*, vol. 78, No. 6, pp. 709-711, Feb. 5, 2001.

El-Habachi et al., "Series Operation of direct current xenon chloride excimer sources," *Journal of Applied Physics*, vol. 88, No. 6, pp. 3220-3224, Sep. 15, 2000.

Frame et al., "Continuous-wave emission in the ultraviolet from diatomic excimers in a microdischarge," *Applied Physics Letters*, vol. 72, No. 21, pp. 2634-2635, May 25, 1998.

El-Habachi et al. "Emission of excimer radiation from direct current, high-pressure hollow cathode discharges," *Appl. Phys. Lett.*, 72(1), pp. 22-24, Jan. 5, 1998.

Oka et al., "Laser-Diode-Pumped Phase-Locked Nd: YAG Laser Arrays," *IEEE Journal of Quantum Electronics*, vol. 28, No. 4, pp. 1142-1147, Apr. 1992.

D. G. Youmans, "Phase locking of adjacent channel leaky waveguide $CO_2$ lasers," *Appl. Phys. Lett.*, 44(4), pp. 365-367, Feb. 15, 1984.

Katz et al., "Diffraction coupled phase-locked semiconductor laser array," *Appl. Phys. Lett.*, 42(7), pp. 554-556, Apr. 1, 1983.

A. D. White, "New Hollow Cathode Glow Discharge," *Journal of Applied Physics*, vol. 30, No. 3, pp. 711-719, May 1959.

* cited by examiner

MICROCHANNEL LASER HAVING MICROPLASMA GAIN MEDIA

PRIORITY CLAIM AND REFERENCE TO RELATED APPLICATION

This application claims priority from prior provisional application Ser. No. 61/000,400, which was filed on Oct. 25, 2007.

STATEMENT OF GOVERNMENT INTEREST

This invention was made with government support under Contract No. FA9550-07-1-0003 awarded by the U.S. Air Force Office of Scientific Research. The government has certain rights in the invention.

FIELD

A field of the invention is lasers. Another field of the invention is microplasma devices.

BACKGROUND

Compact lasers that are commercially available are semiconductor lasers that rely upon photon generation in a solid in response to electrical current. These lasers come in various forms and find many applications although II-VI compound semiconductors have also lased. They are generally fabricated in the Group III-V materials systems. Although semiconductor lasers and laser bars are capable of generating continuous power outputs in the kW range and above, the peak power output available with such lasers is generally low. In particular, semiconductor lasers are not capable at present of providing pulsed visible or ultraviolet (UV) radiation at high peak power (kW and above). Furthermore, semiconductor lasers generally produce output beams of poor quality that are highly divergent and require external collimation. When higher power beams are required, large and expensive gas, chemical, solid state (non-semiconductor), or excimer lasers are typically used.

University of Illinois researchers have led the development of microcavity plasma devices. United States Published Application 2007-0200499, entitled Polymer Microcavity and Microchannel Devices and Fabrication Method and published Aug. 30, 2007, discloses microcavity plasma device arrays formed in polymers, and also discloses high aspect ratio microchannels in which plasma can be formed. Arrays disclosed in that application can have high aspect ratio microchannels that are disclosed as connecting microcavities, and also as being formed into patterns having a wide variety of shapes, e.g., straight, zig-zig and other shapes. Very long, high aspect ratio channels are disclosed, e.g., a one meter channel that is 100 μm wide, yielding an aspect ratio of 10,000:1.

Other work by University of Illinois researchers has provided microcavity plasma devices with tapered microcavities, as disclosed in Eden et al., is U.S. Pat. No. 7,112,918, which issued Sep. 26, 2006. The tapered microcavities could be formed by micromachining, drilling and other semiconductor fabrication techniques, in semiconductor materials. By a preferred wet chemical semiconductor etch, the taper is caused by a difference in the etch rates of the etchant along the different crystalline planes of the semiconductor being etched. The shape of the cavities in the '918 patent when etching is used is also dependent on the semiconductor material used due to the disparity in the etch rates along the different crystalline planes in different material systems. Semiconductor photolithographic and etching processing techniques are disclosed as being a convenient and inexpensive way to form tapered microcavity plasma devices.

SUMMARY OF THE INVENTION

The invention provides microchannel lasers having a microplasma gain medium. Lasers of the invention can be formed in semiconductor materials, and can also be formed in polymer materials. In a microlaser of the invention, high density plasmas are produced in microchannels. The microplasma acts as a gain medium with electrodes sustaining a plasma in the microchannel. Reflectors are used with the microchannel for obtaining optical feedback to obtain lasing in the microplasma gain medium in devices of the invention for a wide range of atomic and molecular species. Several atomic and molecular gain media will produce sufficiently high gain coefficients that reflectors (mirrors) are not necessary. Microlasers of the invention are based on microplasma generation in channels of various geometries. Preferred embodiment microlaser designs can be fabricated in semiconductor materials, such as Si wafers, by standard photolithographic techniques, or in polymers by replica molding.

DETAILED DESCRIPTION OF THE PREFERRED EMBODIMENTS

The invention provides microchannel lasers having a microplasma gain medium. Lasers of the invention can be formed in semiconductor materials, and can also be formed in polymer materials. In a microlaser of the invention, high density plasmas are produced in microchannels, which can be formed to have high aspect (length-to-width) ratios. The microplasma acts as a gain medium with electrodes sustaining plasma in the microchannel. Reflectors may be used in conjunction with the microchannel for obtaining optical feedback to obtain lasing in microplasma gain media in devices of the invention for a wide range of atomic or molecular species. However, several atomic and molecular gain media will produce sufficiently high gain coefficients that optical feedback, and therefore reflectors are not necessary.

Microlasers of the invention are based on microplasma generation in channels of various geometries. Preferred embodiment microlaser designs can be is fabricated in semiconductor materials, such as Si wafers, by standard photolithographic techniques or in polymers by replica molding. Preferred embodiment microlasers are inexpensive to fabricate, so much so that the lasers could be considered to be disposable after limited usage. Inexpensive lasers can be beneficial for several applications, including cell sorting and environmental applications. Both applications often require pulsed visible or ultraviolet (UV) radiation at high peak powers (kW and above) which are not generally available with semiconductor lasers. Because the gain medium in the present invention is a plasma rather than a semiconductor, output wavelengths ranging from the deep-UV to the mid-infrared are available from a single device. Small, low cost lasers provide the ability to produce field-use instruments for environmental, cell sorting, and other applications.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Figure 1A:
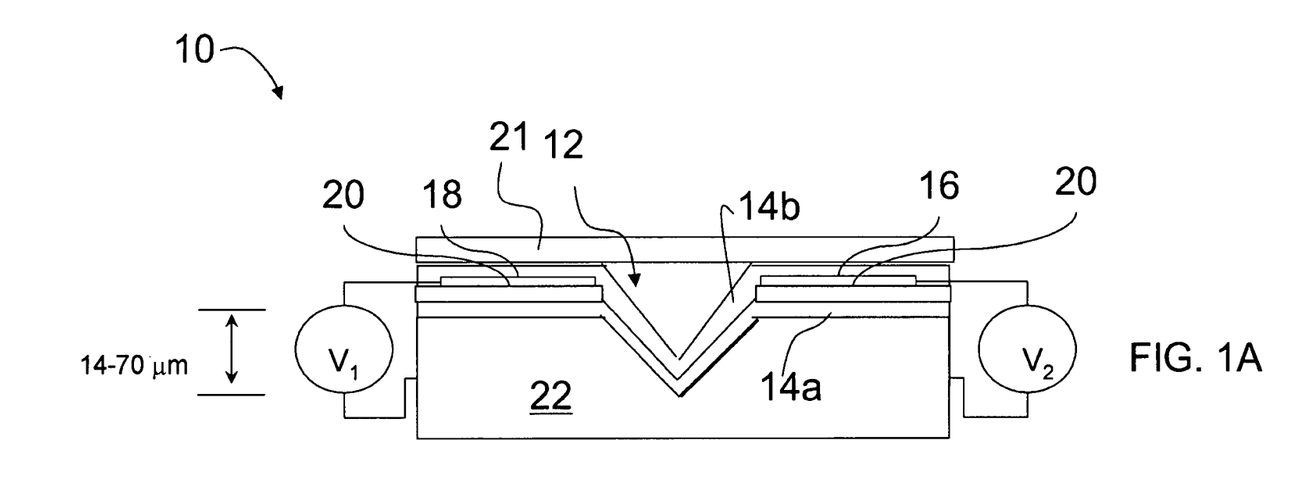
FIGS. 1A-1C are schematic diagrams showing end-on, side and top is views, respectively, of an example embodiment microlaser with microplasma gain media of the invention.
Figure 1B:
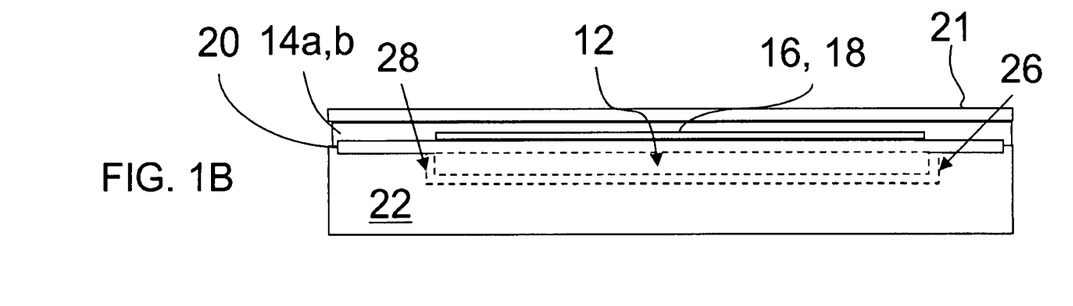
Figure 1C:
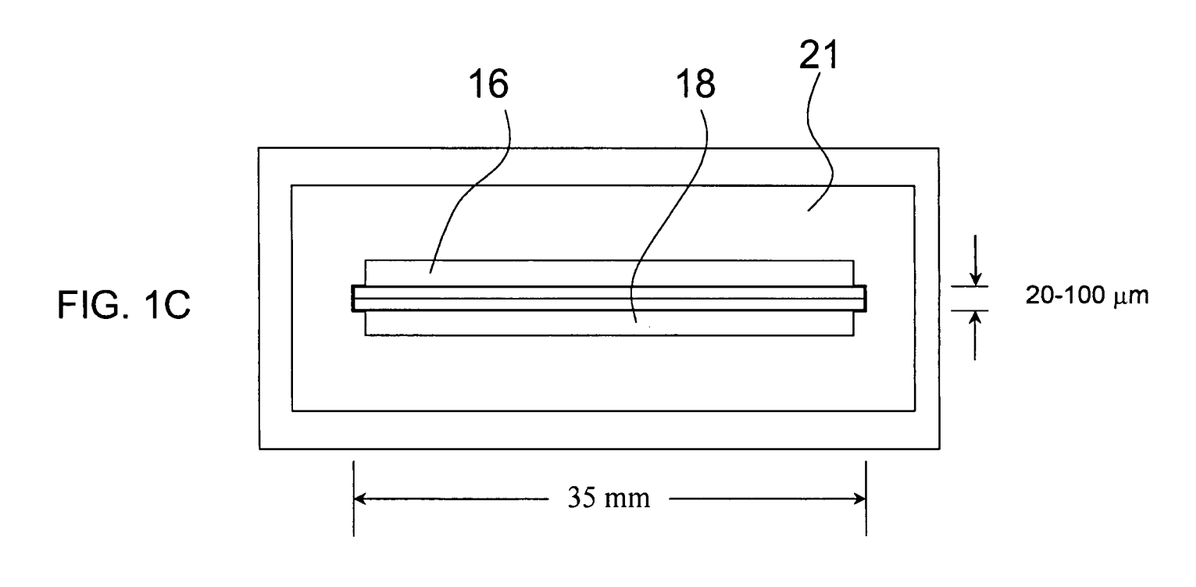

FIGS. 1A-1C are schematic diagrams showing end-on, side and top views, respectively, of an exemplary embodiment microlaser 10 with microplasma gain media of the invention. A microchannel 12 in the example device 10 has a triangular cross-section and can be fabricated in semiconductor material 22, e.g., a silicon wafer, by a wet etching technique similar to that used to produce inverted pyramid microcavities for the large microplasma arrays disclosed in U.S. Pat. No. 7,112,918. As shown in FIG. 1A, the triangular microcavity of the preferred embodiment has a depth of ~14-70 μm and is overcoated and protected by a thin film of a dielectric such as $Si_3N_4$ 14a. This film also serves, along with an additional overcoating 14b of dielectric, to isolate the plasma excitation electrodes 16, 18 from plasma generated in the microcavity 12. The depth of the triangular is cross-section microcavity is determined by the width of the channel at the top (base of the triangle). If the channel is fabricated in Si (100), for example, and the channel width is chosen to be 100 μm, then the depth of the channel at the apex of the triangle will be 70 μm. After forming the thin coating of dielectric 14a, a second dielectric film 20 is formed and along both edges of the microchannel. The dielectric film 20 serves to provide the proper separation between electrodes 16, 18 and substrate 22. The electrodes 16 and 18 are conducting films deposited on both sides of the microchannel 12 over its entire length, or a substantial portion thereof. Overcoating the entire structure with the additional dielectric film 14b completes the electrical structure of the device and isolates the electrodes 16, 18 from plasma formed in the microchannel. A transparent cover 21 seals gases, vapors or combinations thereof (that support plasma generation in the microchannel) within the microchannel 12.

The width of the triangular microchannel 12 at the surface is preferably in a range of about 20-100 μm and its length can be at least several centimeters. As an example, the microchannel 12 can be about 3.5 cm in length. The aspect ratio for the microchannel in the example embodiment is on the order of 1000:1. The electrodes 16, 18 on either side of the triangular microchannel 12 are electrically isolated and, therefore, can be driven at different voltages relative to the potential of the substrate 22. Driving of the electrodes 16, 18 is illustrated in FIG. 1A where voltages $V_1$ and $V_2$ are applied separately to the electrodes. The electrodes 16, 18 drive and sustain plasma in the microchannel, and the plasma acts as a gain medium.

In an experiment, a microchannel device in accordance with FIGS. 1A-1C having a channel width and length of 50 μm and 3.8 cm, respectively, was operated in 500 Torr of Ne. The plasma that developed was uniform along the entire length of the cavity and was well-confined to the trench. Such plasma provides an ideal medium for producing lasing from a variety of atomic and molecular species.

To establish lasing in the plasma gain media formed in the microchannel 12, optical feedback is often required. However, several atomic and molecular gain media will produce sufficiently high gain coefficients that optical feedback is not necessary. Where necessary, optical feedback can be provided by a number of different strategies. In FIGS. 1B and 1C, optical reflectors 26, 28 may be installed at both ends of the microplasma channel for the purpose of providing optical feedback for the microplasma gain medium generated in the microchannel 12 when pumped by electrical excitation of the excitation electrodes 16, 18. The optical feedback structure increases the effective length of the microchannel, and can restrict the allowed spatial and spectral modes of operation.

Figure 2A:
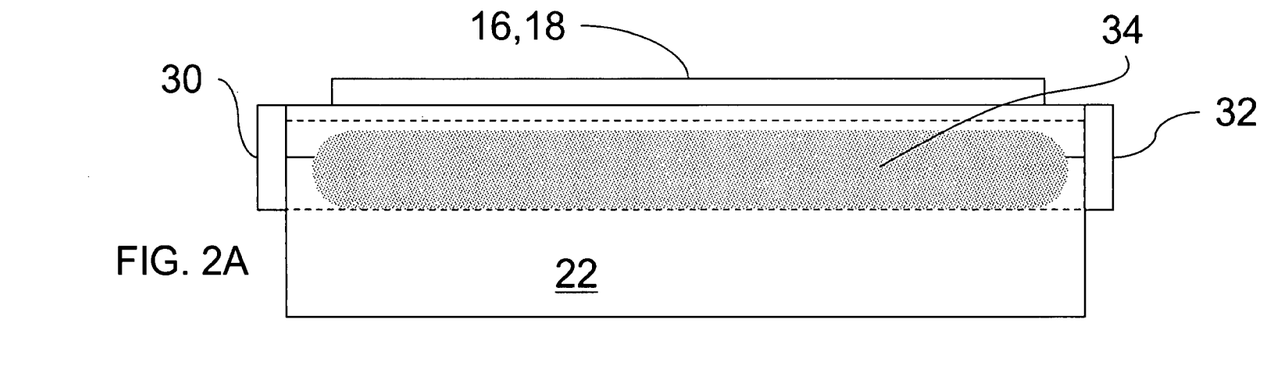
FIGS. 2A and 2B are schematic diagrams showing microlaser devices of the invention with microplasma gain media and alternate types of reflectors to provide optical feedback.
Figure 2B:
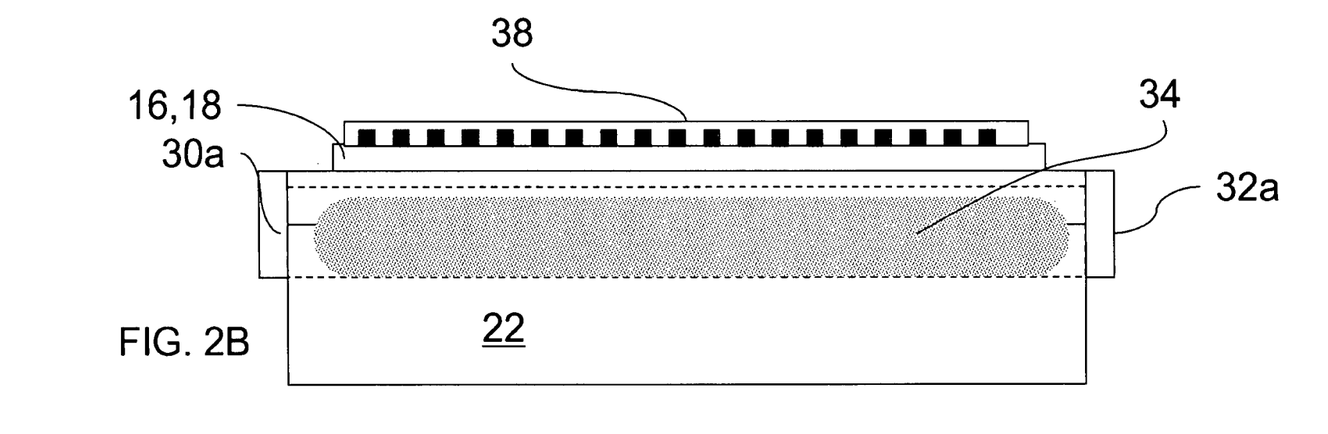

Alternate optical feedback strategies can be used as well, including external reflectors and gratings. FIGS. 2A and 2B are simplified diagrams showing side views of microlaser devices of the invention. The FIG. 2A device uses external reflectors 30, 32 to provide optical feedback for a plasma 34 generated in the device, which is otherwise consistent with FIGS. 1A-1C. As illustrated in FIG. 2A, the external mirrors may be mounted or affixed directly onto the silicon wafer from which the triangular cross-section microchannel is fabricated. An alternative approach is to first fabricate a pre-aligned resonator comprising a base and two optical mirrors, one mounted on each side of the base. The mirror mountings will allow for adjustment of each mirror such that optical alignment of the two mirrors with respect to the optical axis between them is feasible. The final step is then to mount the microchannel device 10 of FIGS. 1A-1C onto the base and between the two mirrors, and optically aligning the channel 12 with respect to the optical axis of the two pre-aligned mirrors.

The FIG. 2B device uses a wavelength selective reflector 38, such as a Bragg structure, situated just above the plasma microchannel. Bragg reflectors offer many possibilities for the laser design presented here, including mounting the Bragg reflector immediately on top of the completed device 10 of FIG. 1A. If a Bragg reflector is used to provide optical feedback, then mirrors are no longer necessary on each end of the microchannel and windows 30a, 32a fabricated from glass, quartz, sapphire, ZnSe (if infrared laser operation is anticipated), etc. are simply affixed to each end of the device as shown. As is well-known in the art, the Bragg reflector 38 can be made from inexpensive materials such as polymers. Also, as mentioned above, the FIG. 2A device may use such windows 30a, 32a in the case where the plasma medium provides sufficient gain to avoid the necessity of the mirrors 30, 32 that provide optical feedback. Optical output is from the windows or the reflectors along the direction of the primary axis of the microchannel 12.

Figure 3:
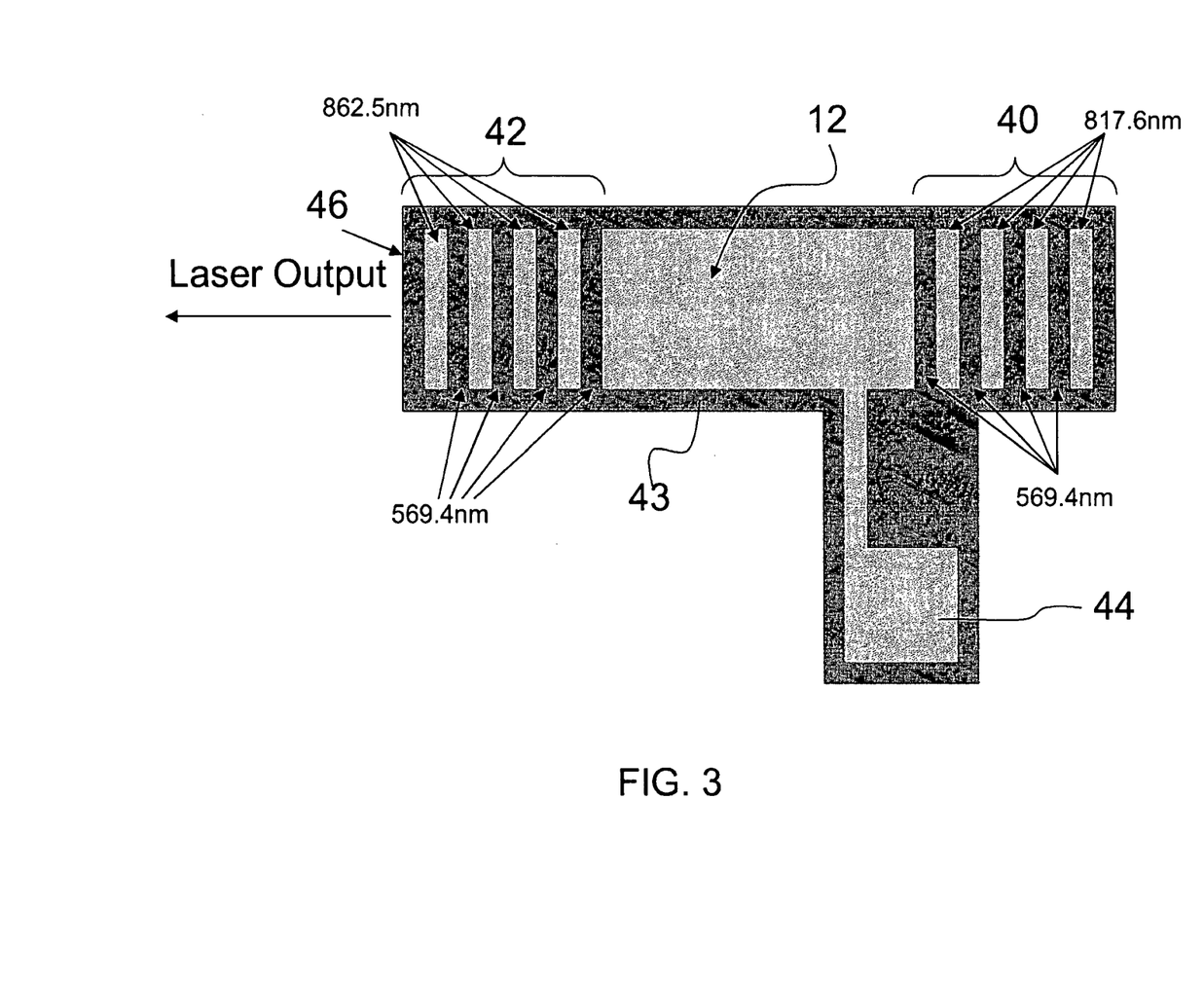
FIG. 3 is a schematic diagram illustrating a type of Bragg reflector that can be used to provide optical feedback in a microlaser device of the invention.

Optical feedback for the microchannel device 10 of FIGS. 1A-1C, when required, can also be provided by an air/Si Bragg structure (a one-dimensional photonic crystal) such as that illustrated in FIG. 3. The device of FIG. 3 integrates the microchannel 12 in Si with a Bragg grating comprising alternating regions of Si and air. The grating includes a dielectric stack 40 and an output coupler dielectric stack 42. Insulator 43 surrounds the device to cut down on leakage and excess capacitive current, and provides the alternate regions of dielectric in the Bragg grating structure. The device of FIG. 3 shows a gas inlet/outlet 44 to permit the plasma medium to be changed. Laser output is from a cleaved facet 46 at the output coupler 42. The structure of FIG. 3 is useful only for laser wavelengths that correspond to photon energies less than the bandgap of Si (~1.1 eV)—otherwise, the optical losses will be unacceptably high. The specific dimensions shown in FIG. 3 are those for Bragg structure having maximum reflectivity at an infrared wavelength of ~1.73 µm.

The structure of FIG. 3 is fabricated by photolithography and conventional etching such that the Bragg reflector is aligned with the axis of the microplasma microchannel. An advantage of this arrangement is that the alignment of the Bragg reflector with the axis of the plasma microchannel can be extraordinarily accurate because of the precision of microfabrication in a semiconductor material, such as silicon. Also, after the structure is fabricated, all is that remains is to fill the channel with the desired gas(es) and seal the top and ends of the channel with an inexpensive window material. An air-Si Bragg structure is of greatest value for wavelengths longer than ~1 µm which corresponds to the bandgap for Si. At shorter wavelengths, losses in Si can become unacceptably high. Several lasers of commercial value (such as Xe at 1.73 µm and $CO_2$ at 10.6 µm) meet this criterion.

Figure 4:
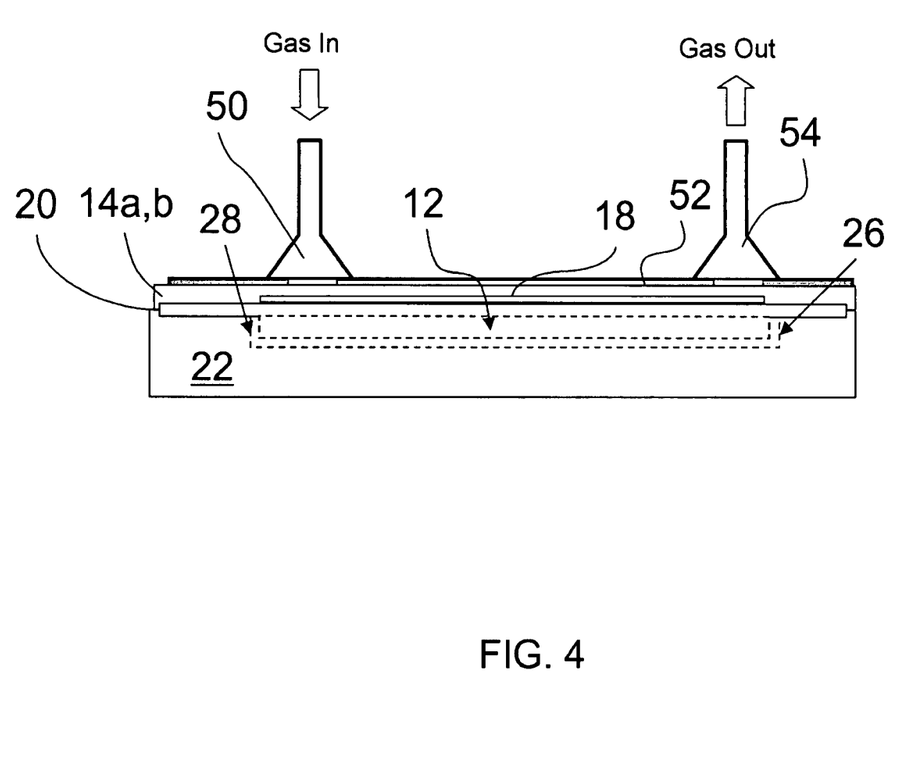
FIG. 4 is schematic diagram of a microchannel-based microchemical reactor of the invention.

FIG. 4 shows a microchemical reactor of the invention. The FIG. 4 device is based on the FIGS. 1A-1C device that has a triangular cross section microchannel. In this application, one or more gases (or vapors) are introduced at one end of the plasma microchannel 12 from a first port 50 through packaging layer 52 and the products produced are extracted at the other end of the microchannel 12 via a second port 54. The larger power densities (tens to hundreds of $kW \cdot cm^{-3}$) and extraordinary plasma channel lengths of devices of the invention make on-chip plasma processing possible. Since such reactors can be produced at low cost, a wide range of applications is possible, e.g., on-chip purification of air (i.e., killing of harmful micro-organisms), ozone production, and "point-of-delivery" plasma synthesis of $H_2$.

The illustrated devices and other devices in the invention can be produced with other materials and fabrication processes. Replica molding, for example, can be used to inexpensively fabricate linear microchannels as well as the Bragg reflectors in polymers. United States Published Application 2007-0200499, entitled Polymer Microcavity and Microchannel Devices and Fabrication Method, published Aug. 30, 2007, discloses microcavity plasma device arrays formed in polymers, and also discloses high aspect ratio microchannels in which plasma can be formed via the replica molding fabrication process. Such microchannels can provide the necessary gain medium for a laser of the invention.

Figure 5:
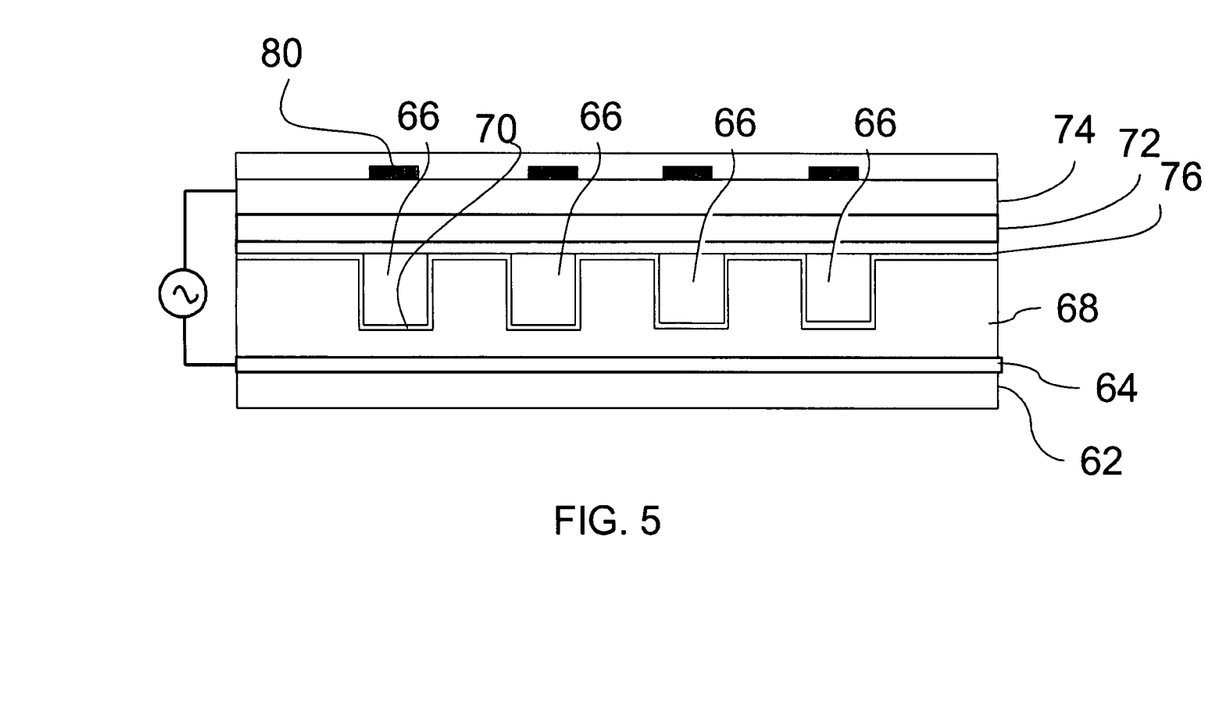
FIG. 5 is a schematic cross-sectional diagram of an example embodiment multiple microlaser with microplasma gain media.

FIG. 5 illustrates an example multiple laser device of the invention based upon such a polymer microchannel device. A substrate 62 is formed of a polymer. Example suitable polymers include flexible plastic material such as polyester (PET), and other rigid or flexible polymer materials, such as polycarbonate and polymethyl methacrylate (PMMA). On top of the substrate 62 is a bottom electrode 64. The bottom electrode 64 can be a conducting film patterned to permit individual addressing of microcavity plasma devices within the array. The bottom electrode 64 can also provide a common electrode for one or more groups of microcavity plasma devices or for all of the microcavity plasma devices in the array.

A plurality of microchannels 66 are formed in a polymer layer 68. The polymer layer 68 is preferably an epoxy layer or an ultraviolet curable polymer, both of which are useful in replica molding processes that can be used to form the microchannels 66. While the microchannels 66 have a rectangular cross section in FIG. 5, the microchannels can have other cross-sectional shapes, including the triangular shape of the FIGS. 1A-1C embodiment. In fact, the triangular channel device structure of FIGS. 1A-1C can readily be modified to realize a linear array of triangular cross-section microchannels that are side by side.

A dielectric coating 70 preferably is used to protect and insulate the inner surfaces of the microcavities 66 from plasma produced within the microcavities 66. The dielectric coating 70 also provides a barrier that slows or blocks vapors outgassing from the polymer layer 68 from reaching the microcavities 66. The dielectric coating 70 can be a thin film, for example a thin film of titanium dioxide $TiO_2$, silicon oxide, tantalum oxide, magnesium oxide or silicon nitride.

The microcavities 66 are sealed by a second polymer substrate 72. The substrate 72 carries an upper electrode 74 and is bonded to the polymer layer 68 via a thin adhesive 76, such as a thin layer of epoxy. In preferred embodiments, the substrate 72 is selected so as to be transparent in the wavelength region of interest for a specific laser (ultraviolet, visible, or infrared). Very long, high aspect ratio microchannels can be formed in polymer materials, e.g., a one meter channel that is 20 µm wide. In the FIG. 5 embodiment, optical feedback for each of the microchannels 66 is provided by a wavelength selective grating, such as separate distributed Bragg gratings 80. The other optical feedback structures discussed above can also be used to provide the necessary optical feedback for lasing. After the structure of FIG. 5 has been fabricated, it is evacuated by a vacuum system and backfilled with the desired gas or gases to a pressure of, typically 300-1000 Torr. The microlaser system of FIG. 5 will provide multiple laser outputs from the separate microchannels 66, thereby permitting the realization of phased arrays.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A microchannel microlaser device, comprising:
 a microchannel containing gas, vapor, or combinations of gases or vapors;
 plasma excitation electrodes disposed to excite a plasma in said microchannel; and
 an optical feedback structure, wherein said microchannel, plasma excitation electrodes and said optical feedback structure are dimensioned and configured and said gas, vapor, or combinations of gases or vapors is selected to achieve lasing within the microchannel itself;
 an optical output along the axis of the microchannel.

2. The device of claim 1, wherein said microchannel comprises a triangular microchannel.

3. The device of claim 1, wherein said microchannel is formed in a semiconductor substrate, the device further comprising dielectric to protect said microchannel and said plasma excitation electrodes from plasma generated in the microchannel.

4. The device of claim 3, wherein said optical feedback structure comprises semiconductor facets at the ends of said microchannel.

5. The device of claim 3, wherein said optical feedback structure comprise reflectors at the ends of said microchannel.

6. The device of claim 3, wherein said optical feedback structure is a wavelength selective grating.

7. The device of claim 6, wherein said optical feedback structure is a Bragg grating.

8. The device of claim 1, wherein said plasma excitation electrodes are disposed on both sides of the microchannel along the length of the microchannel.

9. The device of claim 1, wherein said microchannel is formed in a polymer substrate.

10. The device of claim 1, comprising a plurality of microchannels.

11. A microchannel microlaser device, comprising:
a microchannel containing a microplasma gain medium and being dimensioned to support lasing within the microchannel;
electrodes for electrically exciting the microplasma gain medium; and
optical output means for outputting laser output from the microchannel.

12. The device of claim 11, wherein said electrodes and said microchannel are protected from said plasma by dielectric.

13. The device of claim 11, wherein said microchannel is formed in semiconductor material.

14. The device of claim 11, wherein said microchannel is formed in a polymer material.

15. The device of claim 11, wherein said electrodes are disposed along the length of said microchannel.

16. The device of claim 11, wherein said microchannel has depth of approximately 14-70 µm.

17. A microchannel microlaser device, comprising:
a microchannel containing a microplasma gain medium;
electrodes for electrically exciting the microplasma gain medium; and
optical output means for outputting laser output from the microchannel, wherein said microchannel has depth of approximately 14-70 µm and wherein said microchannel has a length exceeding approximately 0.5 cm, and an upper opening of approximately 30-200 µm.

18. The device of claim 17, wherein said length is between approximately 1 cm and 1 m.

19. The device of claim 11, further comprising optical feedback means for providing optical feedback in said microchannel.

20. The device of claim 1, further comprising ports for introducing gas and/or vapor flow through said microchannel.

21. A microchannel microlaser device, comprising:
a microchannel containing gas, vapor, or combinations of gases or vapors;
plasma excitation electrodes disposed to excite a plasma in said microchannel; and
an optical output along the axis of the microchannel, wherein said microchannel has a length exceeding approximately 0.5 cm, and an upper opening of approximately 30-200 µm.

22. The device of claim 21, wherein said electrodes are disposed along substantially the entire length of said microchannel.

* * * * *

UNITED STATES PATENT AND TRADEMARK OFFICE
CERTIFICATE OF CORRECTION

PATENT NO. : 8,442,091 B2
APPLICATION NO. : 12/682977
DATED : May 14, 2013
INVENTOR(S) : Sung-Jin Park et al.

It is certified that error appears in the above-identified patent and that said Letters Patent is hereby corrected as shown below:

In the Specification:

Col. 3, line 33      After "triangular", please delete "is".

Signed and Sealed this
Seventeenth Day of September, 2013

Teresa Stanek Rea
*Deputy Director of the United States Patent and Trademark Office*